Dec. 31, 1929.                    R. IRVIN                    1,741,367
                                 AIR FILTER
                             Filed Nov. 5, 1926
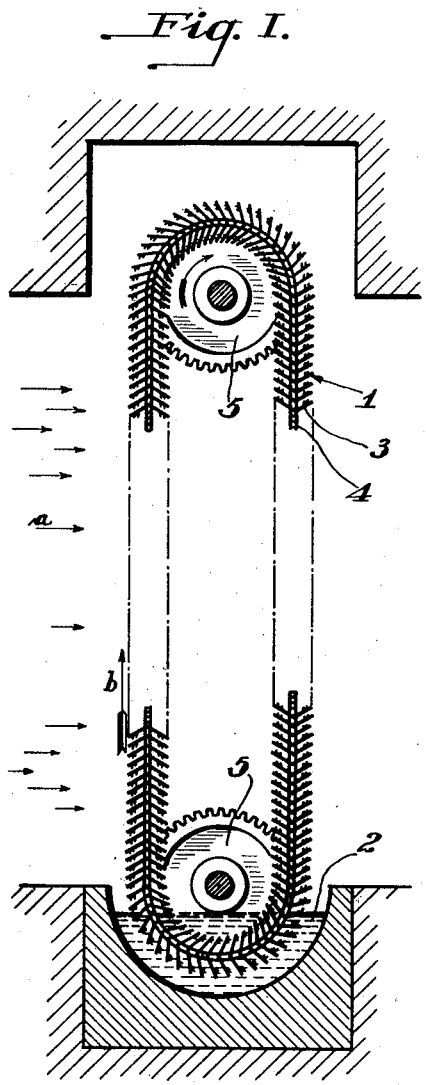
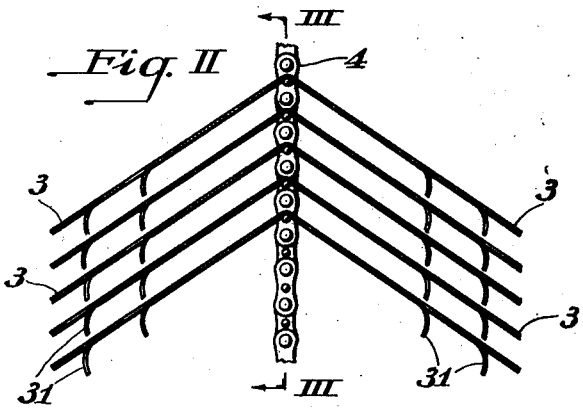
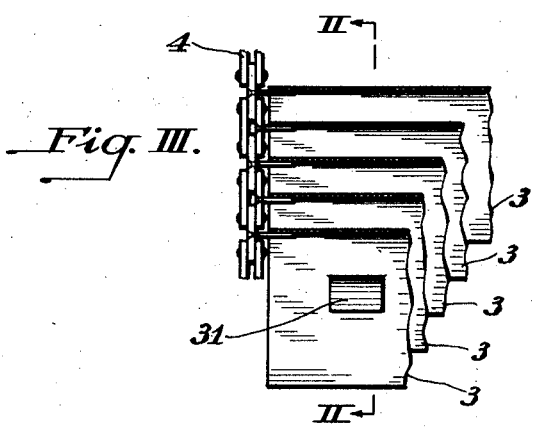
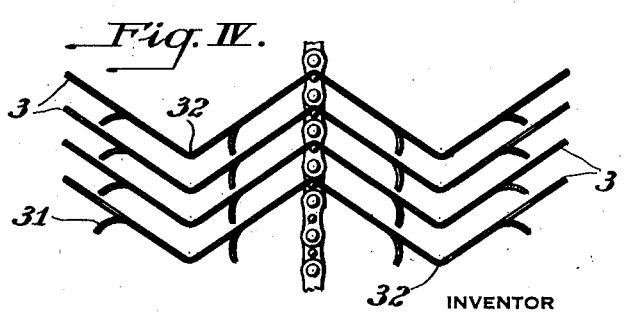

Patented Dec. 31, 1929

1,741,367

UNITED STATES PATENT OFFICE

RICHARD IRVIN, OF KNOXVILLE, PENNSYLVANIA

AIR FILTER

Application filed November 5, 1926. Serial No. 146,421.

My invention relates to improvements in the construction of air filters, and the object of my invention is the provision of a simple, easily and cheaply fabricated structure, strong, durable, and efficient. An embodiment of my invention is illustrated in the accompanying drawings. Fig. I is a diagrammatic view in vertical section of the air-filter in its entirety; Figs. II and III are fragmentary views to larger scale. Fig. II is a view in vertical section on the plane indicated by the line II—II, Fig. III, and Fig. III is a view on the plane indicated at III—III, Fig. II. Fig. IV is a view corresponding to Fig. II and illustrating a modification.

The filter consists of a pervious endless flexible filter member 1, mounted to extend in parallel and vertically arranged reaches, and to travel in the path in which it extends, and constituting a double screen through which the air must flow. As shown in Fig. I the air preferably flows in the direction indicated by the arrow *a* and as it flows it passes through the double screen afforded by the two vertical reaches of the endless filter member 1. The filter member at the lower end of its path of travel dips into a pool 2 of suitable liquid such as oil. The direction of travel is indicated by the arrow *b*. Invention lies in the minute construction of the endless filter member.

In detail the endless filter member is made up of louver-boards or slats 3, pivoted at their opposite ends to the links of two sprocket chains 4. The sprocket chains 4 are carried by pairs of sprocket wheels 5, mounted on common upper and lower horizontal axles. By rotation of one or both of the sprocket-wheel axles the filter member is caused to travel.

The slats or louver-boards extend horizontally. For certain uses these louver-boards may be made of wood, of rubber, or of cast metal, but for filtering air for domestic purposes they may advantageously be made of sheet metal. Spacers are provided for maintaining spaces between the boards, and such spacers will be particularly formed according to the material used in making the louver-boards. These boards being of sheet metal, the spacers may conveniently be formed as tongues 31 slit from the metal sheets of which the boards conveniently are formed, and bent aside. It will be understood that even with spacers, there remains still a certain range of relative movement of the louver-boards in the direction of the length of the filter member. This is necessary, to allow the filter member to advance through the curved portion of its path.

The louver-boards so spaced afford passageways for the advancing stream of air, subdivided of course into many parts. The louver-boards are further so particularly shaped that the streams of air advancing between them do not have straight-away passage, but, meeting sudden turns in the passageway, are not deflected merely, but are caused to swirl. The constituent body of air is thrown into movement transversely of the stream, and so the body of air in all of its parts is brought into immediate contact with the surfaces of the louver-boards. In Fig. II the louver-boards are shown to extend each in two angularly disposed planes; in Fig. IV each board is shown to extend in four planes; and in each case it will be perceived that the passageway for air between successive louver-boards is devious; the direction changes, and, as is preferred, the change in direction is abrupt. It further appears that change in direction may occur once in each passageway, or more than once.

Conveniently the louver-boards are swiveled to the links of the sprocket chains at the middle of their transverse extent, so that they hang balanced from the chains.

Comparison of Figs. I and II will show that the angle which is formed in each louver-board is an upwardly directed angle, and in consequence the louver-boards as they rise from the pool of liquid 2 drain free of surplus liquid. None is retained in the trough-like space formed by and between the angularly meeting parts of the louver-board, because that trough-like space is downwardly flaring. Fig. IV, however, shows how such a trough-like space, even though upwardly flaring, may readily drain free of liquid.

Here because of the plurality of angular turns oppositely directed it is not possible, merely by the arrangement of Fig. II, to have every trough-like space downwardly flaring; and such trough-like spaces as must needs be upwardly flaring are vented at the angle, as indicated at 32, to insure the free escape of surplus liquid as the louver-boards rise from the pool of liquid.

It will be understood that the angle of the louver-boards as shown in Fig. II might be reversed, and the expedient shown in Fig. IV of a vent at the angle might be resorted to, for the end described. And it will be understood that the shaping of the louver-boards to afford devious passageways between them may be modified in a great variety of particular shapes. I have intended merely to indicate particular preferred shapes, sufficient to show that the shaping may vary. It suffices that the shaping be such as to afford devious passageways for the air streams, and preferably the changes in direction of the passageways will be abrupt.

The filter member in its travel as it rises from pool 2 will be coated over all of the surfaces of the louver-boards with the oil or other liquid which constitutes the pool. But surplus liquid will run away, leaving the passageways between the louver-boards free for the flow of air. As the air streams through the passageways between the louver-boards the film of liquid with which the walls of the passageways are coated will take from the air streams particles of solid matter which the air stream bears. Changes in direction of flow of the streams through the passageways will increase transverse movement of the body of air within the stream. In consequence of such transverse movements particles of solid matter borne by the stream which otherwise might pass freely through will be brought into immediate contact with the liquid-coated walls of the passageway, and will in consequence be taken up by the liquid. The stream of air will pass on more completely relieved of its burden of dust.

In passing through the apparatus the stream of air is twice subdivided and twice caused to pass between the louver-boards of the filter apparatus. This reunion of the air streams and second sub-division is another provision, tending to bring every air-borne particle of solid matter into contact with a liquid-coated passageway wall.

While the direction of the flow of air through the filter is preferably that indicated by the arrow $a$, Fig. I, first through the rising reach of the endless filter member and then through the descending reach, the flow may be in opposite direction, and still good results in purification may be got.

The dirt and dust adhering to the louver-boards is carried to the pool 2 and there washed from the louver-boards.

Suitable provision will be made for maintaining the supply of liquid in the pool 2 and for removal from the pool of accumulations of dust and other material filtered from the air. Such provisions are known, and with them my invention is not immediately concerned.

While the invention has been developed for domestic use, to provide clean air for buildings, such as department stores, hotels, and the like, it is manifestly applicable wherever cleaner air is desired than otherwise is to be had,—in enameling plants, for instance, and in paint shops, and in rooms where power-generating machinery is operated. It may be applied to prepare air for service in air-cooling of machinery, in the passages of which dust is apt to lodge and accumulate. It may be applied in removal of dust from metallurgical furnace gases, in collecting smoke from gases discharged through heating furnace flues. It may be applied in collecting fine material thrown into the air by grinding and milling machinery. Generally, it is applicable for cleaning and scrubbing gases.

I claim as my invention:

1. In air-filtering apparatus, and in combination with a conduit through which air advances in a horizontally flowing stream and a pool of liquid arranged beneath the path of stream flow, of an endless filter member with vertical reaches rising from and descending to such pool of liquid and in their rise and descent extending across the path of stream flow, the endless filter member including louver-boards which extend substantially across the breadth of the air conduit, each louver-board comprising a plate so bent that the several bent portions of such plate lie in different intersecting planes, the lines of intersection of such planes with a horizontal plane being parallel, the successive louver-boards forming by and between themselves passageways for the air to be filtered which are of the full width of the air conduit and devious in the direction of stream flow.

2. The structure defined in claim 1, each louver-board being V-shaped in cross-section the apex of the V being closed, and the louver-board so arranged that on the rising side of the filter member the point of the V emerges first from the pool of liquid.

3. The structure defined in claim 1, together with spacers arranged between successive louver-boards.

4. The structure defined in claim 1, the louver-boards being formed of sheet metal and being provided with tongues slit from the sheet and bent aside and constituting spacing members between successive louver-boards.

In testimony whereof I have hereunto set my hand.

RICHARD IRVIN.